P. ADAIR & O. M. COLBERT.
Bee-Hive.
No. 226,821. Patented April 27, 1880.
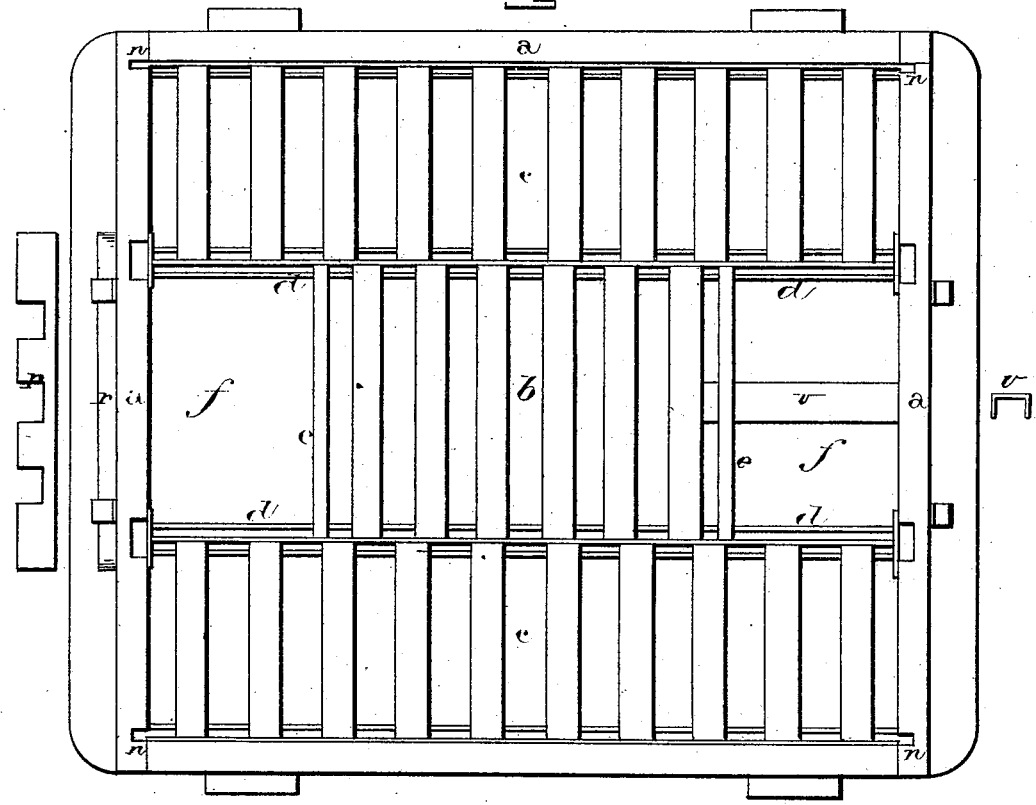
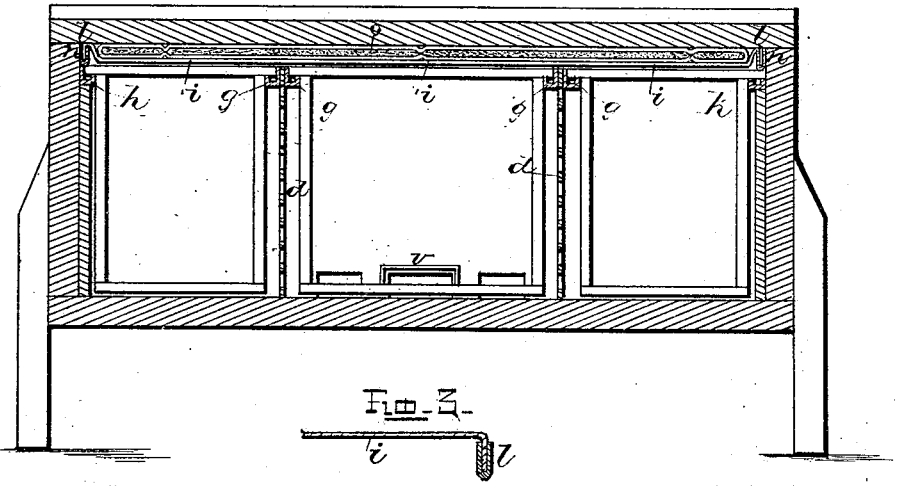
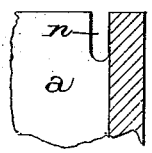

UNITED STATES PATENT OFFICE.

PIKE ADAIR, OF TALBOTTON, AND OBADIAH M. COLBERT, OF BUTLER, GA.

BEE-HIVE.

SPECIFICATION forming part of Letters Patent No. 226,821, dated April 27, 1880.

Application filed March 2, 1880. (Model.)

*To all whom it may concern:*

Be it known that we, PIKE ADAIR, of Talbotton, in the county of Talbot, and OBADIAH M. COLBERT, of Butler, in the county of Taylor, State of Georgia, have invented certain new and useful Improvements in Bee-Hives; and we do hereby declare the following to be a full, clear, and exact description of the invention, such as will enable others skilled in the art to which it pertains to make and use it, reference being had to the accompanying drawings, which form part of this specification.

Our invention relates to an improvement in bee-hives; and it consists in the arrangement and combination of parts that will be more fully described hereinafter, whereby the bees are protected in winter.

Figure 1 is a plan view of our hive with the covering removed. Fig. 2 is a vertical cross-section of the same. Fig. 3 is a detail view of the canvas, showing its binding and the recess in which the binding catches.

$a$ represents the frame, which is made wider than it is high, so that the honey-chambers can be placed beside the brood-chamber, instead of above it, as is generally the case.

The brood-chamber $b$ in the center and the honey-chambers $c$ at the sides are formed by means of the two wire nettings $d$, the meshes of which nettings are just large enough to let the worker-bees pass through when laden with honey, but not when they have pollen on their legs, and thus they are made to deposit all of the pollen in the brood-chamber and not along with the honey. These meshes also prevent the drones and queen-bee from passing through, so as to keep them in the brood-chamber.

During the summer the brood-chamber extends from one end of the frame to the other; but when the cold weather is coming on, and the honey has been removed from the honey-chambers, the cross-partitions $e$ are put into the two longitudinal partitions $d$, so as to contract the brood-chamber, and thus form the two additional chambers $f$. The honey-chambers and the two chambers $f$ are then filled with straw or any non-conducting material, so as to protect the bees from cold.

The wire partitions $d$ have the flanges or supports $g$ secured to each side, near their top edges, so as to hang the honey and brood frames on, and to each side of the frame is secured a similar support, $h$. These supports are made of sheet metal, and are so bent that the frames only rest upon the upturned edges, and thus prevent the bees from sealing the frames fast.

In order to prevent the bees from gluing or sealing the tops of the frames to the under side of the top of the hive, the sheet of canvas $i$ is used. This canvas has its two edges bound with sheet metal $l$, so as to make them rigid, and the ends of this binding are made to project beyond the corners of the canvas sheet far enough to catch in the notches $n$, made in the corners of the frame to receive them. These bindings serve not only to secure the canvas in place, but hold the edges tightly against the inside of the frame. Upon the top of this canvas is placed a pad, $o$, which serves the twofold purpose of protecting the bees from the cold and absorbing whatever moisture there may be in the air inside of the frame, and thus the air is kept dry.

During the summer the bees can crawl directly into the brood chamber at either end; but while they are in winter-quarters the entrances are covered over all the way through the chambers $f$.

Covering the entrances into the hive are the slides $r$, at each end, which slides are reversible, and which can be so adjusted in regard to the entrance that only one bee at a time can enter, and thus the colony can be protected against other bees coming to rob them.

The great advantage gained in using partitions made of wire or perforated sheet metal and placing the chambers all on the same level is that the heat is uniform throughout the whole hive, and the brood-chamber is always kept warm enough to enable wax to be worked at all times.

When the bees are in winter-quarters they enter their quarters through a tin tube, $v$, of suitable size, running through chambers $f$, the other or opposite entrance being closed.

Having thus described our invention, we claim—

1. In a bee-hive, the combination of the two wire or perforated sheet-metal partitions $d$, and the cross-partitions $e$, whereby the chambers $f$ are formed, to be filled with a packing in winter, with the tube $v$, which passes through the bottom of the chamber and through the packing, substantially as shown.

2. In a bee-hive, the frame $a$, having the notches $n$ made in its corners, in combination with the sheet of canvas $i$, having its end bound with metal $l$, which metal, projecting laterally, catches in the notches and holds the canvas stretched across the tops of the chambers, substantially as described.

3. The combination of the frame $a$, having notches $n$ at its corners, with the sheet of canvas $i$, having the metallic bindings $l$ on its ends to catch in the notches, and the cushion $o$, the canvas serving as a support for the cushion, substantially as set forth.

In testimony that we claim the foregoing we have hereunto set our hands this 23d day of December, 1879.

PIKE ADAIR.
OBADIAH M. COLBERT.

Witnesses:
JULIUS H. HOLSEY,
W. P. CALDWELL.